(12) United States Patent
Åhrström

(10) Patent No.: US 12,157,071 B2
(45) Date of Patent: Dec. 3, 2024

(54) MECHANICAL VAPOR RECOMPRESSION (MVR) LIQUID PURIFICATION SYSTEM

(71) Applicant: Aquafair AB, Örebro (SE)

(72) Inventor: Bert-Olof Åhrström, Örnsköldsvik (SE)

(73) Assignee: Aquafair AB, Örebro (SE)

( * ) Notice: Subject to any disclaimer, the term of this patent is extended or adjusted under 35 U.S.C. 154(b) by 11 days.

(21) Appl. No.: 18/003,272

(22) PCT Filed: Jun. 23, 2021

(86) PCT No.: PCT/EP2021/067076
§ 371 (c)(1),
(2) Date: Dec. 23, 2022

(87) PCT Pub. No.: WO2022/002708
PCT Pub. Date: Jan. 6, 2022

(65) Prior Publication Data
US 2024/0042342 A1   Feb. 8, 2024

(30) Foreign Application Priority Data
Jun. 30, 2020 (EP) ..................................... 20183129

(51) Int. Cl.
*C02F 1/04* (2023.01)
*B01D 1/04* (2006.01)
(Continued)

(52) U.S. Cl.
CPC ............. *B01D 1/2887* (2013.01); *B01D 1/04* (2013.01); *B01D 1/2896* (2013.01); *B01D 3/007* (2013.01);
(Continued)

(58) Field of Classification Search
CPC ... C02F 1/041; B01D 1/26; B01D 1/28–2896; B01D 3/065
See application file for complete search history.

(56) References Cited

U.S. PATENT DOCUMENTS

| 3,868,308 A | 2/1975 | Barak |
| 10,046,249 B2 | 8/2018 | Zimmer |

(Continued)

FOREIGN PATENT DOCUMENTS

| CN | 1546386 A | 11/2004 |
| CN | 103272395 A | 11/2014 |

(Continued)

OTHER PUBLICATIONS

International Search Report and Written Opinion for corresponding International Application No. PCT/EP2021/067076.

*Primary Examiner* — Jonathan Luke Pilcher
(74) *Attorney, Agent, or Firm* — Renner, Otto, Boisselle & Sklar, LLP.

(57) ABSTRACT

Mechanical vapor recompression (MVR) liquid purification system includes a pressure-tight enclosure having a circular cylindrical elongated shape along a longitudinal axis A, and evaporation compartments E1-E3 arranged within the enclosure. Each compartment has a plurality of longitudinal pipes running from one sidewall to another sidewall, and circular sidewalls having openings for the plurality of pipes. A central tube runs along the axis A through the centers of the compartments E1-E3, and allows steam to flow from the second end to the first end. The number of pipes is highest in the first compartment E1, then gradually fewer in the second E2 and third E3. The pipes allow steam to flow from the first end to the second end. A compressor assembly includes a compressor provided with compressor vane members structured to provide steam flow along the longitudinal (Continued)

axis and a motor for rotating the compressor at a variable rotational speed.

12 Claims, 2 Drawing Sheets

(51) Int. Cl.
    *B01D 1/28*     (2006.01)
    *B01D 3/00*     (2006.01)
    *C02F 1/00*     (2023.01)
    *C02F 1/08*     (2023.01)
    *C02F 103/08*     (2006.01)

(52) U.S. Cl.
    CPC .............. *C02F 1/008* (2013.01); *C02F 1/041* (2013.01); *C02F 1/043* (2013.01); *C02F 1/048* (2013.01); *C02F 1/08* (2013.01); *C02F 2103/08* (2013.01); *C02F 2201/005* (2013.01); *C02F 2209/42* (2013.01); *C02F 2301/026* (2013.01); *C02F 2303/10* (2013.01)

(56) References Cited

U.S. PATENT DOCUMENTS

| | | | |
|---|---|---|---|
| 2013/0092523 A1* | 4/2013 | Levy | ................. F28F 13/04 202/236 |
| 2016/0158666 A1* | 6/2016 | Winandy | ............... B01D 5/006 202/185.1 |

FOREIGN PATENT DOCUMENTS

| | | | |
|---|---|---|---|
| DE | 2928392 | A1 | 4/1984 |
| DE | 102006056820 | A1 | 9/2007 |
| WO | 2019020605 | A1 | 1/2019 |

\* cited by examiner

MECHANICAL VAPOR RECOMPRESSION (MVR) LIQUID PURIFICATION SYSTEM

This application is a national phase of International Application No. PCT/EP2021/067076 filed Jun. 23, 2021, which claims priority to European Patent Application No. 20183129.4 filed Jun. 30, 2020, each of which is hereby incorporated herein by reference in its entirety.

TECHNICAL FIELD

The present disclosure relates to a mechanical vapor recompression (MVR) liquid purification system, in particular it relates to a multi-stage MVR water desalination system.

BACKGROUND

Mechanical Vapor Recompression (MVR) is an evaporation method by which a blower, compressor or jet ejector is used to compress, and as a result of the compression, increase the pressure, density and temperature of the vapor produced.

As a result, the vapor can serve as the heating medium for its "mother" liquid or solution being concentrated. Without the compression, the vapor would be at the same temperature as its "mother" liquid/solution, and no heat transfer could take place.

The efficiency and feasibility of this process depend on the efficiency of the compressing device (e.g., blower, compressor) and the heat transfer coefficient attained in the heat exchanger contacting the condensing vapor and the boiling "mother" solution/liquid.

Presently used MVR systems have often a relatively high energy consumption.

Below some patent documents within the technical field will be briefly discussed.

U.S. Pat. No. 10,046,249 disclose a compact mechanical vapor recompression evaporator system for e.g. wastewater treatment. The system has a concentric design with an inner channel and a radial MVR device at the channel end, that increases the temperature of the vapor.

CN103272395A discloses an MVR system with three evaporation compartments connected in series inside an enclosure. The evaporation compartments have circular shape and have horizontal tubes running along its interior. In addition, there is a steam collector partly surrounded by the tube bundle inside the evaporation compartments. The compressor is positioned outside the enclosure.

WO2019020605A1 discloses a unit for desalination of water having three serially connected evaporator-condensers and a compressor.

DE2928392 relates to a sea water desalination by descending film evaporation and vapor compression in common horizontal tank.

US2016158666 discloses methods for thermal distillation with mechanical vapor compression.

DE102006056820 relates to a seawater desalination plant comprising a mechanical flow compressor made of radial carbon-fiber-reinforced wheel, a wheel-attachment and housing comprising the wheel.

U.S. Pat. No. 3,868,308 discloses a multiple effect evaporator for use in the distillation of liquids, in general, e.g. for desalination, and of the kind wherein evaporation takes place on the outside of substantially horizontal heat exchange tubes as a result of the heating of the inside of the tubes.

CN1546386 discloses method and device for desalting sea water using a mechanical compression distillation method.

The general object of the present invention is to achieve an improved mechanical vapor recompression (MVR) system, where the main improvements lie in achieving a system that consumes less energy than presently used systems, and that also is robust, easy to operate and maintain. Another object is to achieve a system having a small foot-print and is easy to transport.

SUMMARY

The above-mentioned objects are achieved by the present invention according to the independent claim.

Preferred embodiments are set forth in the dependent claims.

According to one aspect the present invention relates to a mechanical vapor recompression (MVR) liquid purification system, in particular an MVR water desalination system, The MVR system comprises:

A pressure-tight enclosure 2 provided with a first end 4 and a second end 6, having an essentially circular cylindrical elongated shape along a longitudinal axis A, and being essentially horizontally oriented during operation of the system.

Numerous, particularly three, evaporation compartments E1-E3, arranged within said enclosure 2 along the longitudinal axis A, the first evaporation compartment E1 is arranged in relation to the first end 4 of the enclosure, the evaporation compartments are connected in series and have essentially circular cylindrical shapes, each evaporation compartment comprises of two essentially planar and circular sidewalls 8, and each evaporation compartment is provided with a plurality of longitudinal pipes 10 running from one sidewall 8 to the other sidewall 8, and that the circular sidewalls are provided with openings for said plurality of pipes.

The system further comprises:

A central tube 12 running along the longitudinal axis A of the enclosure 2 through the centers of said evaporation compartments E1-E3, and configured to allow steam to flow from the second end to the first end of the enclosure. The number of pipes 10 is preferably highest in the first evaporation compartment E1, then gradually fewer in the second E2 and third E3. Advantageously, the pipes 10 are essentially evenly spread in a cross-section perpendicular to the longitudinal axis of the respective evaporation compartment, and the pipes are configured to allow steam to flow from the first end 4 to the second end 6 of the enclosure 2.

A compressor assembly 14 arranged in relation to said first end 4 of the enclosure 2 and at least partly within said central tube 12, comprising a compressor provided with compressor vane members 16 structured to provide steam flow in an axial direction, i.e. along the longitudinal axis, within said central tube 12 from said second end 6 to said first end 4 of the enclosure 2, the compressor assembly 14 comprises a motor 20 for rotating said compressor at a variable rotational speed, A low vacuum generating member 22 arranged to generate partial vacuum in the evaporation compartments, A control unit 24 configured to control operation of the system according to designated performance, by performing a control procedure adapted to:

generate said partial vacuum in the evaporation compartments (E1-E3), control said motor 20 to operate said compressor at a rotational speed such that an increased temperature is induced to the steam when passing said compressor to achieve desired recycling of specific heat associated to vaporization, and control a plurality of valves and pumps provided to e.g. supply the system with the correct amount of inlet water, maintain correct liquid levels and brine density in the evaporation compartments, expunge brine, recycle heat etc. and to receive purified liquid, e.g. water, from the system.

In one embodiment, the MVR system comprises an inner central tube 36 configured to be arranged concentrically within said central tube 12 and running from said second end 6 of the enclosure 2 towards the first end 4 approximately to a position where axial compressor vane members 16 are arranged. The inner central tube 36 has an outer diameter related to the inner diameter of said central tube 12 such that a steam conducting space 38 is provided between an outer surface of the inner central tube 36 and an inner surface of the central tube 12, and wherein said space 38 has a predetermined size in a radial direction of approximately 0.05-0.25 times the outer radius of the central tube 12.

This embodiment is advantageous, in that the mechanical and structural integrity of the system will improve, due to circular symmetry, and also the thermal efficiency due to complex compressor design and advantageous material conductivity. Furthermore and most prominently; the double-tube concentric embodiment (12, 36) allows the recuperation of not only the remaining heat, but also the remaining kinetic energy of the highly pressurized residual steam, exiting the horizontal pipe arrangement 10, through compartment 42 in the compounded low pressure/high pressure axial compressor arrangement. The super-heated steam recuperation, via the conducting space 38, will furthermore facilitate a positive heat transfer to the low vacuum generated vapor emanating from compartment 46 through the inner central tube 36, and thereby an extra level of redundancy against water droplet condensation and impact damage on the sensitive, long radius, low pressure compressor blades in the low pressure region of the compressor. By deliberately choosing to lead the low pressure steam inside the inner central tube 36, surrounded by the highly pressurized residual steam, the inner central tube may still be manufactured in a slender and weight optimized way since it only receives hydrostatic pressure on the outside (the strongest load-carrying configuration of a circular pipe).

Thus, the MVR system comprises e.g. three evaporation compartments (E1-E3) provided with horizontal pipes arranged within an enclosure. The number of horizontal pipes is preferably highest in the first compartment E1 and is then gradually fewer in the two other compartments in order to retain pressure and temperature even though constant loss of mass due to condensation. A central tube runs along the longitudinal axis of the enclosure, through the centers of three evaporation compartments. Further, a velocity- and pressure compounded, axial and radial compressor assembly, arranged in one end of the central 10 tube, both compresses and changes the direction of the steam running along the tube, thereby increasing the pressure, density and temperature of the steam. The steam is then lead through the horizontal pipes.

An important technical feature that contributes to the low energy consumption, but also to the small foot-print and excellent scalability of the system, is the symmetrical arrangement of the central tube, the compact compressor and the arrangement of the horizontal pipes, with regard to the longitudinal axis.

DETAILED DESCRIPTION

The MVR liquid purification system will now be described in detail with references to the appended figures. Throughout the figures the same, or similar, items have the same reference signs. Moreover, the items and the figures are not necessarily to scale, emphasis instead being placed upon illustrating the principles of the invention.

Figure 1:
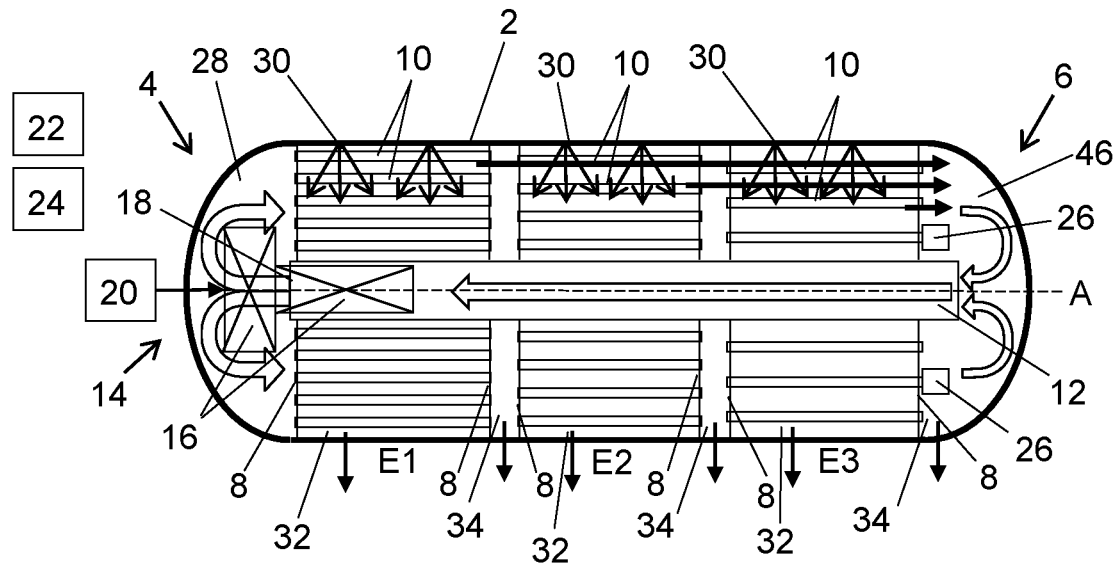
FIG. 1 shows a schematic illustration of a cross-sectional view along the enclosure of the MVR system illustrating the present invention.

With reference to FIG. 1, a mechanical vapor recompression (MVR) liquid purification system, in particular an MVR water desalination system, is provided.

The MVR system comprises a pressure-tight enclosure 2 provided with a first end 4 and a second end 6, having an essentially circular cylindrical elongated shape along a longitudinal axis A, and being structured to be essentially horizontally oriented during operation of the system.

Numerous, particularly three, evaporation compartments E1-E3 are arranged within the enclosure 2 along the longitudinal axis A, where the first evaporation compartment E1 is arranged in relation to the first end 4 of the enclosure, and the last evaporation compartment E3 is arranged in relation to the second end 6.

The evaporation compartments are connected in series and have essentially circular cylindrical shapes.

Each evaporation compartment comprises of two essentially planar and circular sidewalls 8 and a circular cylindrical wall, e.g. being a part of the enclosure 2, between these sidewalls.

Furthermore, each evaporation compartment is provided with a plurality of longitudinal pipes 10 running from one sidewall 8 to the other sidewall 8, and that the circular sidewalls are provided with openings for said plurality of pipes.

Steam conduits are arranged preferably between the top of each compartment and a second end space 44. These steam conduits are illustrated in the figure as black block arrows, and are structured to allow steam to flow from within each of the evaporation compartments E1-E3 to the second end space 44.

The MVR system further comprises a central tube 12 running along the longitudinal axis A of the enclosure 2 through the centers of the evaporation compartments E1-E3, and configured to allow steam to flow from the second end to the first end of the enclosure, more particularly from the second end space 44 to a first end space 28. In FIG. 1 steam flow is indicated by unfilled block-arrows.

The number of pipes 10 is highest in the first evaporation compartment E1, then gradually fewer in the second E2 and third evaporation compartment E3. The pipes 10 are essentially evenly spread in a cross-section perpendicular to the longitudinal axis of the respective evaporation compartment. The pipes are configured to allow steam to flow from the first end 4 to the second end 6 of the enclosure 2, i.e. from the first end space 28 to the second end space 44, then passing through each of the evaporation compartments E1-E3 via a set of liquid collecting spaces 34 where the condensate is harvested in each space, leaving room for more steam in the subsequent evaporation compartment and thereby a higher degree of evaporation heat recuperation, thus; higher system efficiency.

The MVR system also comprises a compressor assembly 14 arranged in relation to the first end 4 of the enclosure 2, i.e. in the first end space 28 and at least partly within the central tube 12.

The compressor assembly 14 is preferably a velocity- and pressure compounded axial- and radial compressor assembly 14 arranged in relation to the first end 4 of the enclosure 2, i.e. in the first end space 28 and at least partly within the central tube 12.

The compressor assembly 14 comprises a compressor provided with compressor vane members 16 structured to provide steam flow in an axial direction, i.e. along the longitudinal axis, within the central tube 12 from the second end 6 to said first end 4 of the enclosure 2, and then further through the horizontal pipes 10 from the first end space 28 to the second end space 44.

The compressor assembly 14 comprises a compressor provided with compressor vane members 16 structured to provide steam flow in an axial direction, i.e. along the longitudinal axis, within the central tube 12 from the second end 6 to said first end 4 of the enclosure 2, and also in essentially radial directions within the first end 4, from an opening 18 of the central tube 12, and then further through the horizontal pipes 10 from the first end space 28 to the second end space 44.

Figure 3:
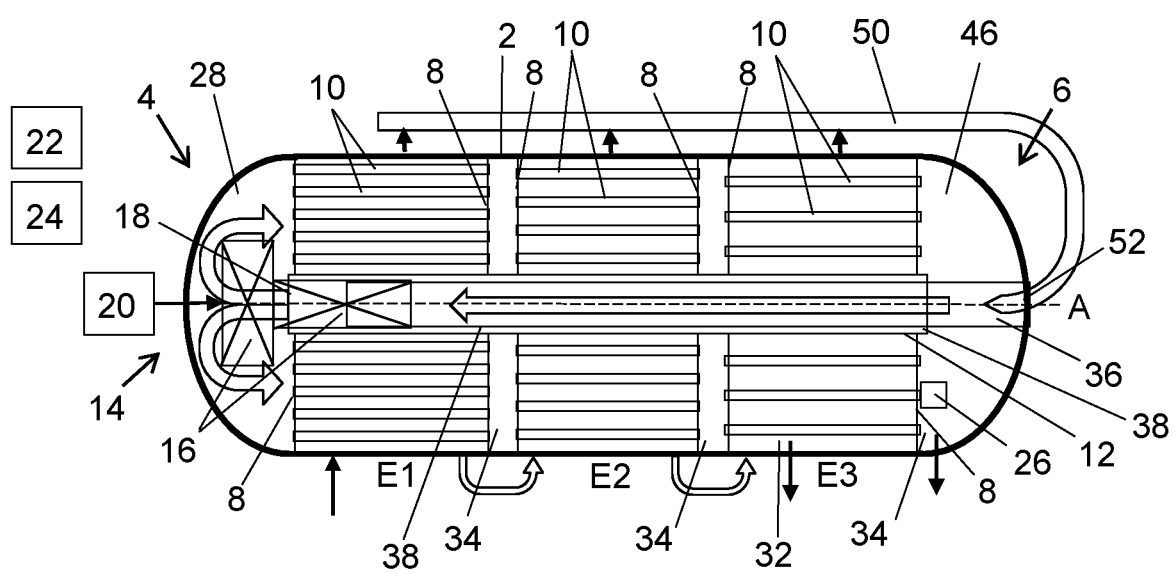
FIG. 3 shows another schematic illustration of a cross-sectional view along the enclosure of the MVR system illustrating another embodiment of the present invention.

The compressor assembly 14 is designed to elevate the pressure and density of the incoming low-vacuum evaporated steam emanating from E1-E3 through the central tube 12, or a central inner tube 36 disclosed in relation to the embodiment illustrated in FIG. 3, to the same level as the high-pressure residual steam (exiting the horizontal pipes 10 into compartment 46) and lead back to the compressor assembly via the said central tube, or the radially peripheral steam conducting space 38 (if embodiment of FIG. 3 is applied). After reaching similar energetic state; both volume flows are adjoined (compounded) and further compressed, in the remaining high-pressure compressor steps, jointly to reach the pressure, temperature and density exactly corresponding to the evaporation rate matching the physical water demand from the fresh water grid. Since all the rotor- and stator discs are circularly symmetric and not slender; they may be of shell-type design, with minimum wall thickness, ultra-low weight and very rigid structure. This will allow them to reach high revolution speeds with minimum rotational deflection or harmonics associated to rotational inertia.

The compressor assembly 14 also comprises a motor 20, which advantageously is a frequency regulated electric motor, for rotating the compressor at a variable rotational speed, optionally; an external gearbox preferably of planetary kind or belt type, and preferably attached to an uncoupled magnetic drive system, to transfer the electric motor work (from outside of the enclosure 2) to the inside compressor assembly 16 without unnecessarily introducing high-pressure seals with their associated induced frictional losses.

A low vacuum generating member 22 is arranged to generate partial vacuum in the evaporation compartments. The connection pipes from the low vacuum generating member 22 to the evaporation compartments are not shown in the figure.

The MVR system is also provided with a control unit 24 configured to control operation of the system according to designated performance. The control unit 24 includes all processing capacity, communication capabilities, and all other circuitry and hardware/software required to perform its intended tasks.

The control unit 24 is configured to perform a control procedure adapted to:
ensure correct operation of the vacuum generating member 22 in order to generate the desired partial vacuum in the evaporation compartments,
control the motor power output 20 to operate the compressor at its designated rotational speed to achieve the desired temperature-, density and pressure increase, thereby optimizing the recycling of specific heat associated to vaporization, of the steam (when passing the compressor assembly 16), additionally
controlling and monitoring a plurality of motorized valves, sensors and pumps provided, to match the system output to the actual physical demand from the external water grid.

According to one embodiment, a plurality of the pipes 10 are provided with steam flow reducing members 26 arranged at downstream openings of the pipes in the second end 6 of the enclosure, i.e. in the second end space 44, for pressure retention purposes as steam condensates and volume decreases. Preferably, the steam flow reducing members 26 are implemented by so-called Tesla valves. However, other means of pressure control systems such as valves, orifices, labyrinths etc. may be utilized to accomplish the same result. A Tesla valve is a fixed-geometry passive check valve. It allows a fluid to flow preferentially in one direction, without moving parts. The interior of the conduit of the valve is provided with enlargements, recesses, projections, baffles, or buckets which, while offering virtually no resistance to the passage of the fluid in one direction, other than surface friction, constitute an almost impassable barrier to its flow in the opposite direction.

The low vacuum generating member configured to generate the partial vacuum in the evaporation compartments is preferably a Torricelli column, but other vacuum generating devices may naturally also be applied. The partial vacuum in the evaporation compartments should be in the range of 0.2-0.6 atm, and preferably approximately 0.4 atm (either absolute or in average).

The first end space 28 is defined by the sidewall 8 of the first evaporation compartment and the inner surface of the enclosure 2. The inner surface of the first end has a symmetrical concave shape displaying a predetermined curve-form adapted to guide the radially directed steam flow into a direction essentially along the longitudinal axis A, towards the second end 6 of the enclosure 2. At least the radial part of the compressor is arranged within the first end space 28.

Each evaporation compartment is preferably provided with a large number of spraying nozzles 30 arranged to be supplied by inflow liquid from inflow liquid tubing (not shown). The spraying nozzles are arranged to spray inflow liquid within the evaporation compartments, and in particular arranged such that sprayed liquid reaches and wets all pipes evenly. Thus, the spraying nozzles are arranged in both the upper part as well as the lower part within the evaporation compartments. In the figure, only few spraying nozzles are shown.

In an alternative variation, the evaporation compartments E1-E3 may be fully flooded with the liquid, thereby eliminating the necessity of spraying nozzles completely. This alternative variation is applicable in combination with all embodiments disclosed herein.

This may be provided by supplying one of the end evaporation compartments E1 or E3 with the liquid through an opening. The first and second compartments are then connected by a pipe, schematically indicated in FIG. 3 by a block arrow in the lower part of the enclosure to allow liquid to flow from E1 to E2 or vice versa. Similarly, another pipe is connected between E2 and E3 to allow liquid to flow from E2 to E3 or vice versa.

According to the invention, each evaporation compartment is provided with an inflow liquid collecting container 32 arranged at the bottom of each evaporation compartment and intended to collect non-vaporized inflow liquid. The collecting container 32 comprises a level sensor configured to measure the level of inflow liquid and to generate a level signal when the liquid level deviates from a predetermined liquid level interval. The level signal is applied to the control unit, that, in accordance with the control procedure, facilitates upstream liquid supply system to react accordingly to maintain a desired balance. The outflows of liquid from the inflow liquid collecting containers 32 (schematically illustrated by arrows) are performed by applicable tubes and valves. At least some of the outflow from the inflow liquid collecting container 32 of evaporation compartment E1 is supplied to the spraying nozzles of E2, and similarly, the outflow from the inflow liquid collecting container 32 of evaporation compartment E2 is supplied to the spraying nozzles of E3.

According to the invention, purified liquid collecting spaces 34 are provided between evaporation compartments (in the illustrated system between E1 and E2, and between E2 and E3) for collecting purified liquid. The liquid collecting space 34 being delimited by the sidewalls 8 of the adjacent evaporation compartments, and the inner surface of the enclosure. The outflows of purified liquid from the liquid collecting spaces 34 (schematically illustrated by arrows) are performed by applicable tubes and valves.

The inner diameter of the central tube 12 is preferably in the range of 0.1-0.5 times of the outer diameter of the enclosure 2, and the inner diameter of a longitudinal pipe 10 is in the range of 0.01-0.1 times of the diameter of the central tube 12.

In one variation, the number of pipes 10 in the first evaporation compartment E1 is in the range of 50-500, and the number of pipes 10 in the second evaporation compartment E2 is in the range of 5-15% fewer than the number of pipes in the first evaporation compartment E1. And further, the number of pipes 10 in the third evaporation compartment E3 is in the range of 5-15% fewer than the number of pipes in the second evaporation compartment E2.

In another variation, the number of pipes 10 is (with respect to above) declining with only 1-3% by each evaporator step and ultimately; in a third embodiment, the number of horizontal pipes stretching through the evaporation compartments E1-E3 is maintained constant.

As illustrated in FIG. 1, the pipes 10 in the evaporation compartments have essentially straight extensions parallel to the longitudinal axis A.

However, as an alternative, the pipes 10 in at least the first evaporation compartment E1 may have slight spiral curve form with regard to the longitudinal axis, to adapt to the steam flow from the radial compressor vane members 16. Thus, a small skewing of the pipes will increase pipe length in the evaporation compartments (or correspondingly call for a slight decrease in width of evaporation compartment E1 to encompass for the skewing). However; it will reward the system efficiency with a larger relative surface area of condensation/evaporation and ultimately a more favourable fluid dynamic orientation, with respect to the curvilinear flow presented by the final (radial) compressor step, towards the first essentially planar surface 8 adjacent to the first end space 28, for enhanced kinetic energy recuperation downstream.

With references to FIG. 2, a further embodiment of the MVR system will be discussed. This embodiment is similar to the embodiments disclosed above in relation to FIG. 1, and it is referred to that description for all parts not discussed below.

According to this embodiment an inner central tube 36, is provided, configured to be arranged concentrically within the central tube 12 and running from the second end 6 of the enclosure 2 towards the first end 4 approximately to a position where axial compressor vane members 16 are arranged.

The inner central tube 36 has an outer diameter related to the inner diameter of the central tube 12 such that a steam conducting space 38 is provided between an outer surface of the inner central tube 36 and an inner surface of the central tube 12. The steam conducting space 38 has a predetermined size in a radial direction of approximately 0.01-0.1 times the outer radius of the central tube 12.

The inner central tube 36 is arranged concentrically within the central tube 12 by a spacer arrangement (not shown) comprising of a number of circular spacers, or preferably "splines" arranged along the tubes. The spacers are structured such that a steam conducting space 38 is defined, that allows steam flow to easily pass through the steam conducting space.

Figure 2:
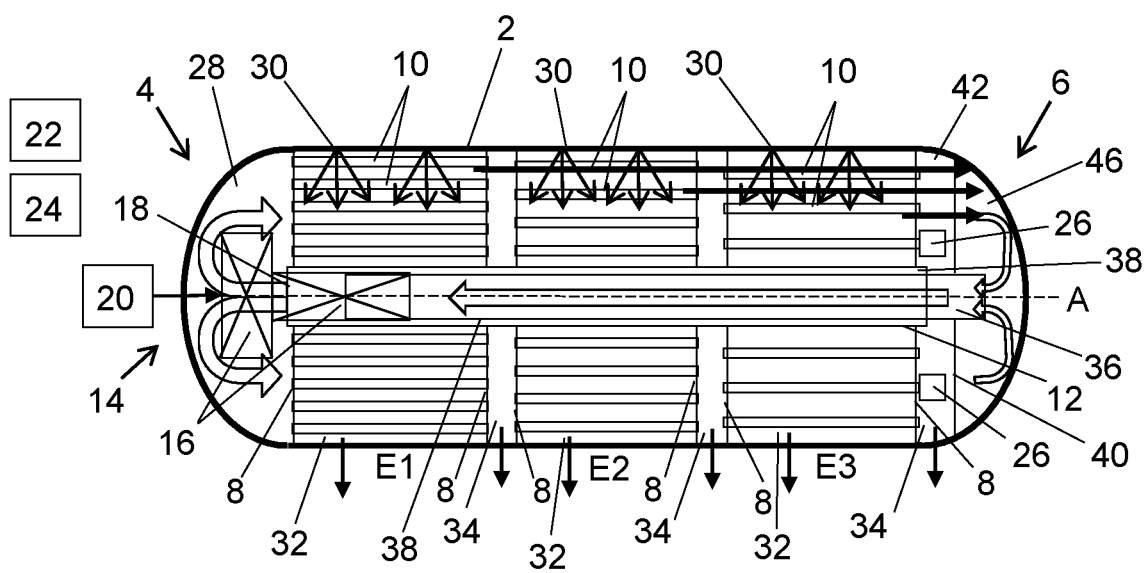
FIG. 2 shows a schematic illustration of a cross-sectional view along the enclosure of the MVR system illustrating one embodiment of the present invention.

Still with references to FIG. 2 and the embodiment illustrated therein, the second end 6 of the enclosure 2 is provided with a delimitation wall 40 essentially parallel to the sidewall 8 of the evaporation compartment E3. The delimitation wall 40 is arranged to divide the space defined by the sidewall of the closest evaporation compartment E3 and the outer wall of the enclosure into a second end liquid collecting space 42, closest to the evaporation compartment, and an alternative second end space 46. The central tube 12 opens into the second end liquid collecting space 42 such that steam present therein may enter the steam conducting space, and the inner central tube 36 opens into the alternative second end space 46 such that steam present therein may enter the inner central tube. The steam in the steam conducting space will have higher temperature, pressure, density and kinetic energy than the steam in the inner central tube.

The steam produced by evaporation under partial vacuum is lead through the inner central tube 36 to the low-pressure compressor region for initial compression and becomes, at a suitable pressure step inside the axial compressor; compounded with the high-pressure steam collected in second end liquid collecting space 42 and transported to that particular pressure step in the compressor via the steam conducting space 38, that ends immediately before the said compressor step. Subsequently; both mass flows are combined pressurized by the remaining high-pressure region of the axial compressor and further compressed and lead to direction change of its kinetic energy, in the specially designed radial compressor, and lead through the horizontal pipes 10 for subsequent recuperation of the increased internal energy. The axial compressor vane members 16 are structured to protrude, at least partly, into the inner central tube 36 in order to help sustaining partial vacuum in the evaporation compartments E1-E3, facilitate the flow of steam from the second end 6 to the first end 4 of the enclosure and to bring the low-pressure steam up to practically the same energetic state as the highly pressurized residual steam exiting the horizontal tubes 10 after completing a full cycle of vaporization heat recuperation.

The kinetic energy of the compressed vapor is harvested in the last high-pressure manifold 42 (adjacent to the second end of the enclosure) and lead back to the compressor via the steam conducting space 38 in order to assist and promote rotation of the axial-/radial compressor and thereby increase system efficiency.

Preferably, the compressor, stators and surrounding walls inside the axial compressor assembly are made by a suitable 3D-printing technique, preferably from metallic or composite material, further preferably of thermoplastic nature, and optionally coated for higher resilience. The bearings (rolling element, sliding or hydrodynamic by fluid or gas) in a pivot point inside the inner central tube 36 and in the high pressure compressor compartment are foreseen to become lubricated, preferably with low-pressure steam, and their housing may become externally cooled.

With references to FIG. 3, a further embodiment of the MVR system will be discussed. This embodiment is similar to the embodiments disclosed above in relation to both FIGS. 1 and 2, and it is referred to that description for all parts not discussed below, however; significant simplifications and optimizations have been introduced in order to increase manufacturing simplicity, reduction of both operating expense (OPEX) and capital expense (CAPEX) and predominantly simplicity of operation and maintenance.

In this embodiment, the MVR comprises steam conducting pipes 50 arranged to conduct steam from each of the evaporation compartments E1-E3 to the outside of the second end 6 of the enclosure that is provided with an opening 52 for said inner central tube 36. The opening 52 is structured to receive steam conducted through the steam conducting pipes 50 and to provide a steam flow to the inner central tube 36. In FIG. 3 the steam received by the steam conducting pipes is schematically indicated by arrows from each of the compartments E1-E3.

Preferably, the steam conducting pipes 50 are arranged at the outside of said enclosure 2, e.g. as separate pipes from each of the evaporation compartments.

As an alternative, the steam conducting pipes 50 may be an integral part of the enclosure 2 arranged at the outer or inner surface of the enclosure wall, like a collecting plenum.

According to this embodiment and in sequence of operation, the horizontal conduits are now directly attached to a plenum, realized by the steam conducting pipes 50, connecting directly to the inner central tube 36 which has been extended to protrude out of the end wall of the second end space 46.

The last high-pressure second end liquid collecting space 42, disclosed in the embodiment shown in FIG. 2, (adjacent to the second end of the enclosure) has been removed and the highly pressurized residual steam (exiting the horizontal tubes 10 through the essentially planar and circular sidewall 8 after evaporation compartment E3) end up in the second end space 46 directly. The central tube 12 now starts within said compartment and leads the said pressurized steam towards the axial compressor manifold (compound) while simultaneously pre-heating the low-pressure vapor (in the inner central tube 36) during its passage along the dedicated steam conducting space 38.

In this particular embodiment, the evaporation compartments are fully flooded in liquid and interconnected in the bottom E1 to E2, and respectively E2 to E3 via pipes (see unfilled block arrows) according to the communicating vessel principle. By introducing this significant change, all high-pressure spray nozzles (for evaporation pipe wetting purposes), their associated pumps, frequency converters, motorized valves and control elements could be completely omitted, and the level in all three evaporation compartments E1-E3 is only controlled by two level sensors built into both of the two peripheral compartments E1 and E3 (leaving no room for human error while positioning/levelling the flatbed arrangement on the ground), that dictates the performance of the feed water pump (not represented in the figures) via the embedded control system 24.

All four liquid collecting spaces (first end space 28, liquid collecting spaces 34, and second end space 46) are communicating via dedicated interconnected horizontal pipes, allowing for two plausible points of fresh water harvesting (bottom of compartments 28 and/or 46) depending on the levelling of the flatbed container arrangement on the ground.

A brine mobilizing system, driven by a brine expunge pump, is located inside of one of the peripheral evaporation chambers E1 or E3 (on the bottom) in order to facilitate expunge of concentrated hot brine through the thermal recuperation system (not depicted in the figure). Its location is predestined by the fact that the concentration of pollutant inside of the evaporation chambers increases in every step (from right to left or vice versa) as a part of the fraction of fresh water gets evaporated and extracted in every consecutive step.

In an advantageous embodiment, the enclosure 2 has external dimensions such that it fits into a regular sea container, and is then preferably provided with flatbed attachment point. However, the external dimensions of the enclosure may be freely scaled in both directions due to its favourable circular symmetry.

The low vacuum generation member is provided to generate a partial vacuum in the evaporation compartments of approximately 0.4 atm (approx. 40 kPa) during continuous operation. As mentioned above, the low vacuum generation member is preferably a Torricelli column intended to self-sustain the necessary partial vacuum of ca 0.4 atm during continuous operation, but in order to reach this degree of partial vacuum, initially, a vacuum pump may be required. Hand-valves are opened to allow vacuum to form in all three evaporation compartments E1-E3, and as the vacuum pump decreases global system pressure, it will correspondingly suck up water from the bottom vessel, which in its turn will trigger a liquid level sensor (ultimately leakage alarm in a telemetry reporting system) to open the motor valve to replenish the lost water in the bottom Torricelli vessel.

As soon as the desired partial vacuum is obtained, and the baseline gray water level in the first evaporation compartment E1 is secured, a level sensor in E1 instructs a seawater pump to seize action; not to flood the system unnecessarily.

At this point, an E1 circulation pump is engaged, with a motor valve set on 100% recirculation. The system is carefully controlled for leakage free operation before resistive heating element (submerged in inflow liquid collecting container of the first evaporation compartment E1) is switched on.

In another embodiment, a peripheral evaporation compartment E1 or E3 is allowed to become fully flooded in gray water and separated from the other evaporation compartments via a hand operated valve. The circulation of the introduced water mass is handled by a flexible hose connected to the gray water pump intake manifold, and the heating (to approximately 80 C) is facilitated by either repetitive passing through the optional solar panel array (until the desired internal system temperature has been reached) or, via repetitive passing through an external heating element (resistive, capacitive, inductive, microwave, heat exchanger or similar).

During recirculation, the gray water is gradually heated to approximately 80 degrees Centigrade, heating the horizontal corrosion resistant, falling film pipes 10 and the surrounding walls simultaneously, until a system temperature of approximately 75° C. is reached, where water will start to evaporate spontaneously due to the prevalent slight under-pressure in the internal system (i.e. in the evaporation compartments).

At this point of time, a motor (driving the combined axial- and radial compressor) is started and careful inspection of possible leaky joints commences. Overpressure leaks are extremely dangerous since the steam is over-critically heated thus; temperature is high, visible steam is noticeable only several centimeters above the leakage and skin burn will be severe/extreme if closely encountered.

At this moment; a motorized valve may be put on "fully automatic mode" which will start filling the second evaporation compartment E2 of the MVR system. The through-going pipes 10 will already be hot (by the recompressed vapor) and low pressure; meaning that evaporation will immediately start in the second evaporation compartment E2 as well. The increased amount of material will accelerate the process leading to an immediate "fully automatic mode" setting off a last motorized valve as well.

In another embodiment, the remaining evaporation compartments E2 and E3, or E1 and E2, may now become flooded as well (since the steam generation is already operational in the firstly filled chamber and sufficient heat is produced in the horizontal pipes 10 for triple evaporation chamber operation). The corresponding hand valves between E1 and E2, and E2 and E3 are now opened, and the control unit will continue gray water pump supply until the point where all evaporation chambers are correspondingly filled to designated levels.

With all three evaporation compartments E1-E3 properly supplied with gray water, the unit is now operating at designated performance, i.e. dictated by the rotational speed of the compressor resulting in over-pressure of the steam, that in its turn results in induced pressure/volume work, resulting in increased temperature of the super-critical steam, resulting in predestined heat transfer, that in its turn results in desired recycling of specific heat associated to vaporization.

Latest at this point, the resistive heating of the gray water in the first peripheral evaporation compartment E1 or E3 (or by other auxiliary or internal means, at different pertinent points adjoined or affiliated to the first peripheral evaporation loop) is suspended since the power of the compressor supplies the necessary heat for the continuation of the process without need for auxiliary heating/power sources. Additional heat may of course be continued (e.g. via external heating by a solar array in order to increase effectiveness), but that is an optional benefit and not dictated by a system restriction.

Below, the over-critical steam path will be followed, from the high pressure region of the compressor, through the horizontal pipes 10 to the low pressure compartment (i.e. in the second end space 46, or in the alternative second end space 46, back at the inlet of the central tube 12, and/or the inner central tube 36.

As a part of the steam condenses on the inside of the pipes 10 in the first evaporation compartment E1, it is imperative to quickly separate the condensate from the steam in order to make valuable surface area free for further condensation. Any liquid substance inside the pipes has already given away the evaporation energy, to under-critical "cold" gray water in the adjacent under-pressure compartment. Therefore, the amount of steam is less in the consequential compartments unless the compressor volume flow turns out to be sufficient to fully replenish the pressurized steam consumption (at the rate needed by the condensation process in three stages) in order to maintain maximum operation. In order to retain pressure e.g. a Tesla valve is introduced in the end of the last step. The reason thereof is to decrease the inevitable pressure drop in the suction duct of the compressor and thereby ascertain the positive flux of thermal energy transfer (from over-critical steam to gray water evaporation) till the very end.

Between all stages, condensate is collected (to make room for the over-critical steam to contact the inside surface of the horizontal condensation pipes) in the purified liquid collecting spaces 34. Since the pressure is duly positive, no transfer pumps are needed to transport the liquid to a fresh liquid collection vessel (not shown).

The condensate is 100° C. warm, duly disqualifying it for immediate use for "ordinary" purposes including drinking and showering. The rising volume of fresh water in a collecting freshwater tank may signal to a valve to automatically pass freshwater onto an external freshwater grid via a counter flow heat exchanger in order to recuperate the latent heat and warm the seawater, thus, correspondingly increasing efficiency and lowering the freshwater temperature as the degree of utilization increases.

Since the evaporation stages, i.e. the evaporation compartments E1-E3, are mutually interconnected; the next step is fed from the previous. Since every stage evaporates fresh water, leaving more and more "dirty" water behind, the "dirt"/"salt" residue increases significantly in each stage.

In an alternative embodiment, the fully flooded evaporation compartments E1-E3 are generating low pressure steam that are channeled to the central pipe 36 via the overhead steam plenum, i.e. via steam conducting pipes 50. Furthermore in this embodiment; the low pressure steam is propelled from the second end 6 to the first end 4 of the system due to the suction created in front of the low-pressure compressor step, preferably partially, or possibly even totally, harnessed within the inner central tube 36, and brought up to an internal energy greatly equivalent to the highly pressurized residual steam entering from the steam conducting space 38, and compounded in the axial compressor vane members 16 at the compression stage, or plenum, suitable for rejoining two separate gas flows in terms of gas pressure and density. The levels of the evaporation compartments are controlled by the level in the last stages E1 or E3, and previous upstream compartments will receive the necessary and suitable gray water flow through the principle of communicating vessels. As brine has a higher density, and the communication piping is harnessed in the lowest part of the system, the brine concentration will increase in every consecutive evaporation compartment automatically and naturally.

The last stage in sequence, i.e. E1 or E3, is therefore predestined to host not only a level sensor, but additionally a density sensor as well (in order not to lose grip of the saline/dirt proportion and risk producing a viscous remnant that is not possible to pump). The density sensor will signal to the control unit 24 that a brine ejection is needed at some point. In one variation, a motorized valve switches from overhead showering (with the spraying nozzles 30) to underneath salt-crystal-breaking, turbo stirring action for a few seconds, in order to increase possibility of pumping of the salt/dirt brine solution.

In another variation, where the spraying nozzles are excluded, the underneath salt-crystal-breaking modus is commenced without disruption of other flows.

Subsequent to the introduction of a well-timed turbulence burst, in the lower portion of the last evaporation stage; a motorized valve switches to expunge mode; thereby letting the brine out, e.g. into the surrounding nature or dedicated vessel. The brine may pass through a heat exchanger, and a motorized valve may decide to open a lower loop to a degree necessary to recuperate the brine heat. As soon as the brine expunge stops, the heat flux to a lower heat exchanger will cease and as it gradually cools, the motorized valve will gradually close that loop and focus its attention fully on the upper fresh water loop instead.

In still another variation, the brine expunge from one of the end evaporation compartments e.g. E1 or E3, is maintained at a constant level and runs via an external heat recuperation system such as a brine recycling reactor/device, electrochemical reactor, or simply a separate brine reduction/purification system.

The vacuum pump is controlled by a pressure sensor (internally monitoring the system). If pressure (despite the free-of-charge vacuum produced in the Torricelli column) becomes above normal, it automatically engages. Otherwise, it is fully disengaged as long as the system operates leakage free.

An auxiliary pump may be provided, that may be freely engaged (via flexible hoses to certain pre-planned connection ties) in order to enable discrete pump service or exchange of faulty equipment without jeopardizing production or quality of maintenance due to time schedule pressure. It will be CPU-controlled and by mouse click configurable to 100% assume the faulty pumps operational behavior in an instant.

An expressive telemetry algorithm, implemented in the control unit 24, will periodically communicate system pressures (leakage detection), temperatures (plaque or deposit aggregation on the inside of the pipes and heat exchangers), water in/water out data and power consumption for billing/efficiency purposes, brine expunge rate, solar panel array contribution to overall efficiency, alarms or abnormalities etc.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A mechanical vapor recompression (MVR) liquid purification system, in particular an MVR water desalination system, comprising:
   a pressure-tight enclosure provided with a first end and a second end, having circular cylindrical elongated shape along a longitudinal axis A, and being-horizontally oriented during operation of the system,
   first, second and third evaporation compartments E1, E2, and E3, arranged within said enclosure along the longitudinal axis A, wherein the first evaporation compartment E1 is arranged closer to the first end of the enclosure than the second evaporation compartment E2 and the third evaporation compartment E3, wherein the third evaporation compartment E3 is arranged closer to the second end of the enclosure than the first evaporation compartment E1 and the second evaporation compartment E2, the first, second and third evaporation compartments E1, E2, and E3 are connected in series and have circular cylindrical shapes, each evaporation compartment comprises first and second planar and circular sidewalls, and each evaporation compartment is provided with a plurality of longitudinal pipes running from the first sidewall to the second sidewall, and the first and second circular sidewalls are provided with openings for said plurality of longitudinal pipes, wherein each evaporation compartment is provided with two or more spraying nozzles arranged to be supplied with inflow liquid from inflow liquid tubing, or inflow liquid is supplied to one of the first evaporation compartment E1 or the second evaporation compartment E3 through an opening, and pipes are provided to allow liquid to flow to the other compartments,
   wherein said system further comprises:
   a central tube running along the longitudinal axis A of the enclosure through centers of said first, second, and third evaporation compartments E1, E2, and E3, and configured to allow steam to flow from the second end to the first end of the enclosure,
   a compressor assembly arranged at said first end of the enclosure and at least partly within said central tube, comprising a compressor provided with compressor vane members structured to provide steam flow along the longitudinal axis, within said central tube from said second end to said first end of the enclosure, wherein the compressor assembly further comprises a motor for rotating said compressor at a variable rotational speed,
   a partial vacuum generating member arranged to generate partial vacuum in the evaporation compartments,
   wherein the first evaporation compartment E1 comprises a greater number of the plurality of longitudinal pipes than the second evaporation compartment E2, and the second evaporation compartment E2 comprises a greater number of the plurality of longitudinal pipes than third evaporation compartment E3, and wherein the longitudinal pipes for each evaporation compartment are evenly spread in a cross-section perpendicular to the longitudinal axis of the respective evaporation compartment, and the longitudinal pipes are configured to allow steam to flow from the first end to the second end of the enclosure,
   wherein each evaporation compartment is provided with an inflow liquid collecting container arranged at a bottom of each evaporation compartment and configured to collect non-vaporized inflow liquid, wherein the collecting container comprises a level sensor configured to measure a level of inflow liquid and to generate a level signal when a liquid level deviates from a predetermined liquid level interval, and wherein purified liquid collecting spaces are provided between the evaporation compartments for collecting purified liquid, said purified liquid collecting spaces being delimited by the first sidewall of one of the evaporation compartments and the second sidewall of another of the evaporation compartments that is adjacent to said one of the evaporation compartments, and an inner surface of the enclosure, and wherein outflow of purified liquid from the liquid collecting spaces is enabled by tubes and valves,
   wherein the system further comprises a control unit configured to control operation of the system according to designated performance, by performing a control procedure adapted to:
   generate said partial vacuum in the evaporation compartments,
   control said motor to operate said compressor at a rotational speed such that temperature of the steam is increased when the steam passes said compressor to achieve desired recycling of specific heat associated to vaporization, and control a plurality of valves and pumps provided to supply the system with the inflow liquid and to receive purified liquid from the system.

2. The MVR system according to claim 1, wherein a plurality of the longitudinal pipes are provided with steam flow reducing members arranged at downstream openings of the pipes in the second end of the enclosure, for pressure retention purposes as steam condensates and volume decreases, and wherein said steam flow reducing members are Tesla valves.

3. The MVR system according to claim 1, wherein a first end space is provided, defined by the inner surface of the enclosure and the first or second sidewall of the first evaporation compartment E1 that is closest to the inner surface of the enclosure at the first end, wherein an inner surface of the first end of enclosure has a symmetrical concave shape displaying a predetermined curve-form adapted to guide the steam flow in a radial direction and further into a direction along the longitudinal axis A towards the second end of the enclosure.

4. The MVR system according to claim 1, wherein said enclosure has external dimensions such that the enclosure it fits into a sea container, and is provided with a flatbed attachment point.

5. The MVR system according to claim 1, wherein an inner diameter of the central tube is in a range of 0.1-0.5 times of an outer diameter of the enclosure, and an inner diameter of a longitudinal pipe is in a range of 0.01-0.1 times of a diameter of the central tube.

6. The MVR system according to claim 1, wherein the longitudinal pipes in the first evaporation compartment E1 have spiral curve forms with regard to said longitudinal axis, to adapt to the steam flow from the compressor vane members.

7. The MVR system according to claim 1, comprising an inner central tube configured to be arranged concentrically within said central tube and running from said second end of the enclosure towards the first end to a position where axial compressor vane members are arranged, wherein said inner central tube has an outer diameter disposed relative to an inner diameter of said central tube such that a steam conducting space is provided between an outer surface of the inner central tube and an inner surface of the central tube, and wherein said space has a predetermined size in a radial direction of approximately 0.05-0.25 times the outer radius of the central tube.

8. The MVR system according to claim 7, further configured such that steam produced by evaporation under partial vacuum is lead through said central tube, said steam conducting space, and said inner central tube to the compressor for compression and subsequently recuperation of evaporation heat, and wherein said axial compressor vane members are structured to protrude, at least partly, into said inner central tube in order to help sustain partial vacuum in the evaporation compartments E1, E2, and E3.

9. The MVR system according to claim 7, wherein said second end of the enclosure is provided with a delimitation wall parallel to the first or second sidewall of the third evaporation compartment E3 that is closest to the inner surface of the enclosure at the second end, wherein said delimitation wall is arranged to divide a space defined by the first or second sidewall of the third evaporation compartment E3 that is closest to the inner surface of the enclosure at the second end and the inner surface of an outer wall of the enclosure at the second end into a second end liquid collecting space and an alternative second end space, and wherein said central tube opens into said second end liquid collecting space, and that said inner central tube opens into said alternative second end space.

10. The MVR system according to claim 7, comprising steam conducting pipes arranged to conduct steam from each of said evaporation compartments E1, E2, and E3 to an outside of said second end of the enclosure, wherein the second end of the enclosure is provided with an opening for said inner central tube, wherein said opening is structured to receive steam conducted through said steam conducting pipes and to provide a steam flow to the inner central tube.

11. The MVR system according to claim 10, wherein said steam conducting pipes are arranged at the outside of said enclosure.

12. The MVR system according to claim 1, wherein the compressor vane members are provided structured to provide steam flow in radial directions within said first end, from an opening of said central tube.

* * * * *